United States Patent
Verbo et al.

(10) Patent No.: US 6,912,850 B2
(45) Date of Patent: Jul. 5, 2005

(54) BRAKE BOOSTER WITH HIGH KICK-OFF EMERGENCY VALVE

(75) Inventors: Ulysse Verbo, Aulnay-sous-Bois (FR); Jean-Marc Attard, Chantilly (FR); Antony Auguste, Villiers sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 10/451,471

(22) PCT Filed: Oct. 12, 2001

(86) PCT No.: PCT/FR01/03912

§ 371 (c)(1), (2), (4) Date: Jun. 16, 2003

(87) PCT Pub. No.: WO02/47952

PCT Pub. Date: Jun. 20, 2002

(65) Prior Publication Data

US 2004/0046445 A1 Mar. 11, 2004

(30) Foreign Application Priority Data

Dec. 14, 2000 (FR) .............................. 00 16459

(51) Int. Cl.$^7$ ............................... B60T 13/20
(52) U.S. Cl. ..................................... 60/553
(58) Field of Search .................................. 60/553, 574

(56) References Cited

U.S. PATENT DOCUMENTS 5,921,084 A * 7/1999 Gautier et al. ................ 60/553

* cited by examiner

Primary Examiner—F. Daniel Lopez
(74) Attorney, Agent, or Firm—Leo H. McCormick, Jr.; Warren Comstock

(57) ABSTRACT

A braking device for a motor vehicle, including a master cylinder (2) with a primary piston (3) subjected to an actuating force of an input force exerted by a manual operating member (4) and a boost force exerted by a booster (6) coupled to the manual operating member (4) and an emergency assist valve (VA). Valve (VA) comprises: a reaction piston (19) sliding in a bore (20) of the primary piston (3) and urged toward a position of rest by by an elastic return member (22); a rapid piston (32) having a cross section smaller than the reaction piston (19) and sliding in a sealed manner in a bore (31) of a bushing (30) in bore (200; and a ratio control (27) actuated by a plunger distributor (10) driven by the manual operating member (4). The elastic return member (22) is arranged outside of the primary piston (3) and a transmission element (T) is provided to transmit a return force of the elastic return member (22) to the reaction piston (19).

18 Claims, 4 Drawing Sheets

BRAKE BOOSTER WITH HIGH KICK-OFF EMERGENCY VALVE

The invention relates to a boosted braking device for a motor vehicle, of the type of those which comprise a master cylinder controlling the pressure in at least one brake circuit, a primary piston slidably mounted in the master cylinder to create therein a variation in pressure, this primary piston being subjected to an actuating force made of an input force exerted by a manual operating member and of a boost force exerted by a booster coupled to the manual operating member.

The booster may be pneumatic and comprise a rigid casing divided into two pneumatic chambers by a moving partition which may be subjected to a difference in pressure between the chambers under the action of a valve actuated by the manual operating member, this moving partition driving a pneumatic piston.

A braking device of this type is known, for example from FR-B-2 658 466 or from EP-B-0 662 894.

The conditions under which braking is exerted may vary. A first scenario corresponds to ordinary conditions when an obstacle is seen from afar and braking is exerted relatively gently; this braking is known as "normal braking" or "slow braking". Another scenario is that of sudden braking or "emergency braking", for example when an obstacle suddenly appears in front of the driver who has to bring his vehicle to a standstill as quickly as possible.

With a view to satisfying these various braking conditions, a boosted braking device of the aforementioned type has been supplemented by an emergency assist valve capable of invoking at least two boost ratios corresponding respectively to slow braking and to emergency braking; the boost ratio for slow braking is lower and the hydraulic reaction to the advance of the manual operating member is higher. For emergency braking, the boost ratio is higher and the hydraulic reaction that counters the manual operating member is lower, which means that the driver can brake harder and for longer.

By convention, in the remainder of the text, the term "front" will be used to denote a direction oriented from the operating member towards the master cylinder, and the term "rear" will be used to denote the opposite direction.

The emergency assist valve comprises: a reaction piston subjected to the action of an elastic return means returning it to a position of rest, this reaction piston sliding in a sealed manner in a bore of the primary piston, the front part of this bore communicating with the interior volume of the master cylinder; a rapid piston of a cross section smaller than that of the reaction piston sliding in a sealed manner in another bore of corresponding diameter; and a ratio control actuated by a plunger distributor itself driven by the manual operating member, the assembly being arranged so that, under emergency braking, a hydraulic reaction is exerted only on the cross section of the rapid piston.

Such a braking device with an emergency assist valve proves satisfactory both from the operating point of view and from the braking effort point of view. However, the embodiments put forward to date are relatively expensive and impose a relatively low limit on the value of the jump, a reminder of the definition of which is given later on with reference to FIG. 2. Furthermore, these embodiments do not allow the design to be standardized for various versions of the master cylinder, particularly in the case of boost ratios which can vary from 3 to 6.6 with master cylinders whose diameter can vary from 19.6 mm to 24.5 mm.

A first object of the invention is to develop an economical solution to the emergency assist valve that allows the value of the jump to be increased while at the same time reducing the spread on it.

Another object of the invention is to propose a solution which allows standardization for master cylinder versions of appreciably different diameters.

According to the invention, a boosted braking device for a motor vehicle, of the aforementioned type, comprising an emergency assist valve is characterized in that the elastic return means for returning the reaction piston is arranged outside the primary piston, and in that a transmission element is provided to transmit the return force of the elastic means to the reaction piston.

The elastic return means for returning the reaction piston, which creates the jump, may thus have larger dimensions than if it were housed in the primary piston, which allows the value of the jump to be increased.

The elastic return means generally consists of a compression spring. This spring, known as the jump spring, is advantageously arranged inside the booster. The pneumatic piston may comprise a cavity facing forwards, and the jump spring is arranged in this cavity, particularly around the plunger distributor.

A pneumatic piston reinforcement is provided and consists of a disc with a central opening for the passage of the reaction piston, this disc being connected to the pneumatic piston and determining therewith a chamber in which the jump spring is placed. The disc bears, forwards, against the primary piston.

The disc is held, in the pneumatic piston, bearing backwards against a shoulder of the pneumatic piston. According to a first possibility, the disc comprises, at its periphery, a forward-projecting cylindrical skirt, externally threaded and screwed into into [sic] a mating screwthread provided on the interior surface of a cylindrical part of the pneumatic piston. According to another possibility, the disc has no threaded skirt and is held, at the front, by a split elastic ring anchored in a groove of the pneumatic piston.

The transmission element may comprise a plate, preferably circular, this plate comprising a central opening for the passage of the ratio control, and bearing, on one side, against the reaction piston and, on the other side, against the elastic return means. The plate is arranged so that it can move in the pneumatic piston, to the rear of the piston reinforcement. Advantageously, the plate comprises, at least on its face facing towards the plunger distributor, a reaction deadening means for deadening the contact between the plate and the plunger distributor. This deadening means may consist of a mass of elastomeric material bonded to the plate and having at least one bulge projecting backwards towards the plunger distributor; preferably another bulge projects forwards.

A guide means for guiding the plate may be provided, for guiding this place relative to the plunger distributor. This guide means may comprise a central cylindrical sleeve secured to the plate, projecting towards the plunger distributor, this sleeve being slidingly received in a blind bore of the plunger distributor, open to the front. The sleeve comprises a central passage for the ratio control and for a push-rod provided on the plunger distributor.

The invention also relates to a pneumatic booster for a boosted braking device with an emergency valve, the booster comprising a rigid casing divided into two pneumatic chambers by a moving partition which can be subjected to a difference in pressure between the chambers under the action of a valve actuated by the manual operating member, this moving partition driving a pneumatic piston, characterized in that a jump spring for an emergency valve is housed in the booster and in that a transmission element for transmitting the force of the jump spring is also provided in the booster.

The pneumatic piston may have a cavity facing forwards, whereas a piston reinforcement connected to the pneumatic piston is arranged at the front of this cavity, the jump spring being arranged between the bottom of the cavity and a plate which can move in the pneumatic piston and which is stopped at the front via the piston reinforcement.

Apart from the provisions set out hereinabove, the invention consists of a certain number of other provisions which will be dealt with more explicitly hereinbelow with regard to some exemplary embodiments described in detail with reference to the drawings appended hereto which are not in any way limiting. In these drawings.

Figure 5:
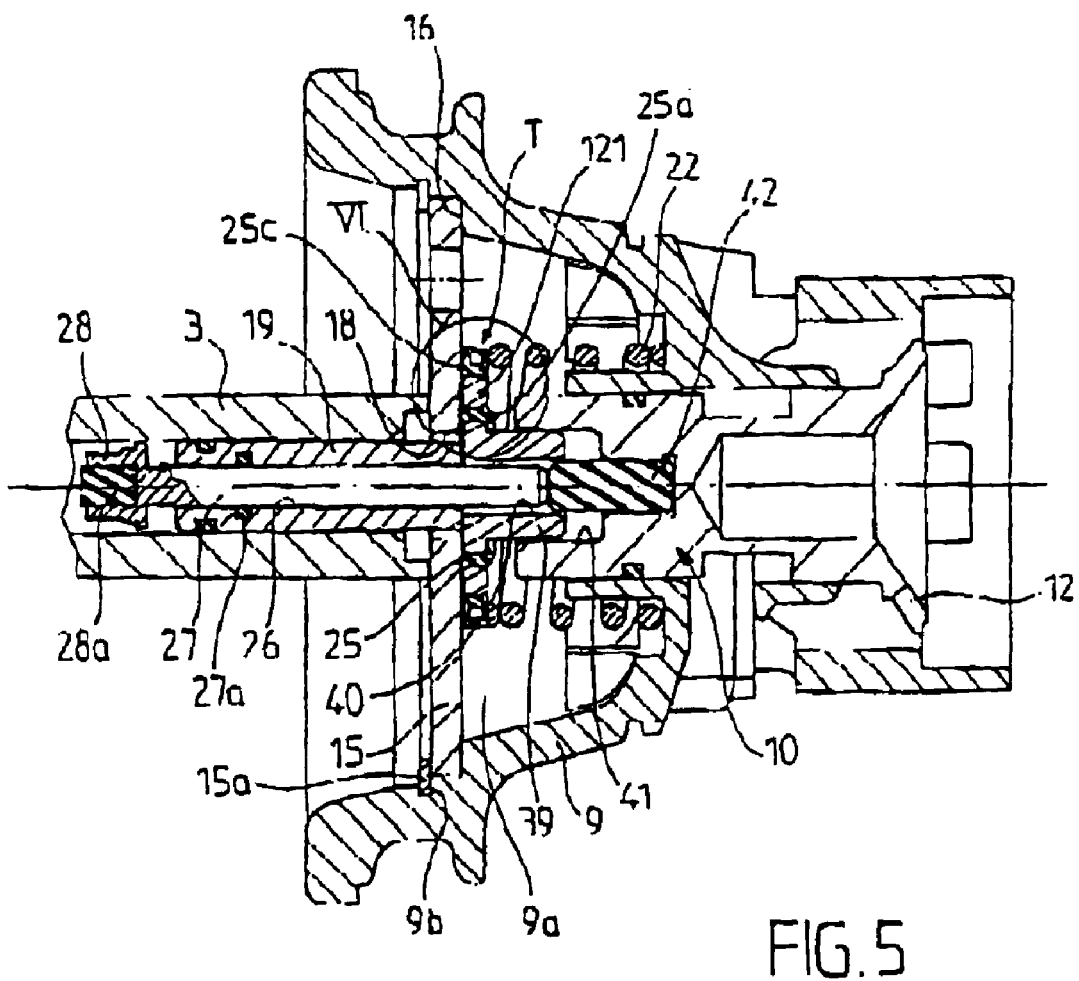
FIG. 5 is a part view in section of an alternative form of embodiment.
Figure 6:
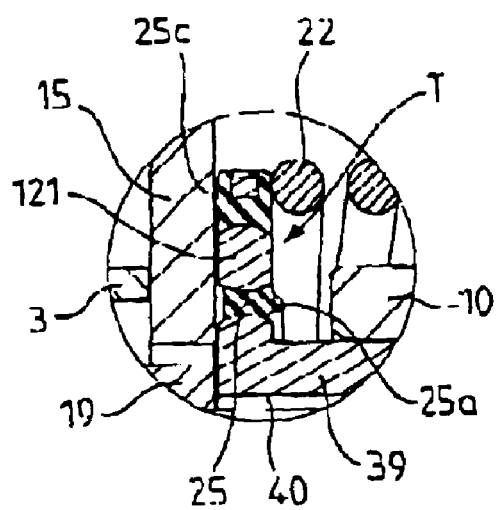

Finally, FIG. 6 shows, in section, on a larger scale, detail VI of FIG. 5.

The overall structure and general operation of a boosted braking device of the type of the invention are known, particularly from patents EP-B-0 662 894 or FR-B-2 658 466 and only a brief reminder thereof will be given. For further details, reference can be made to the two cited patents which are incorporated into the description by reference.

Figure 1:
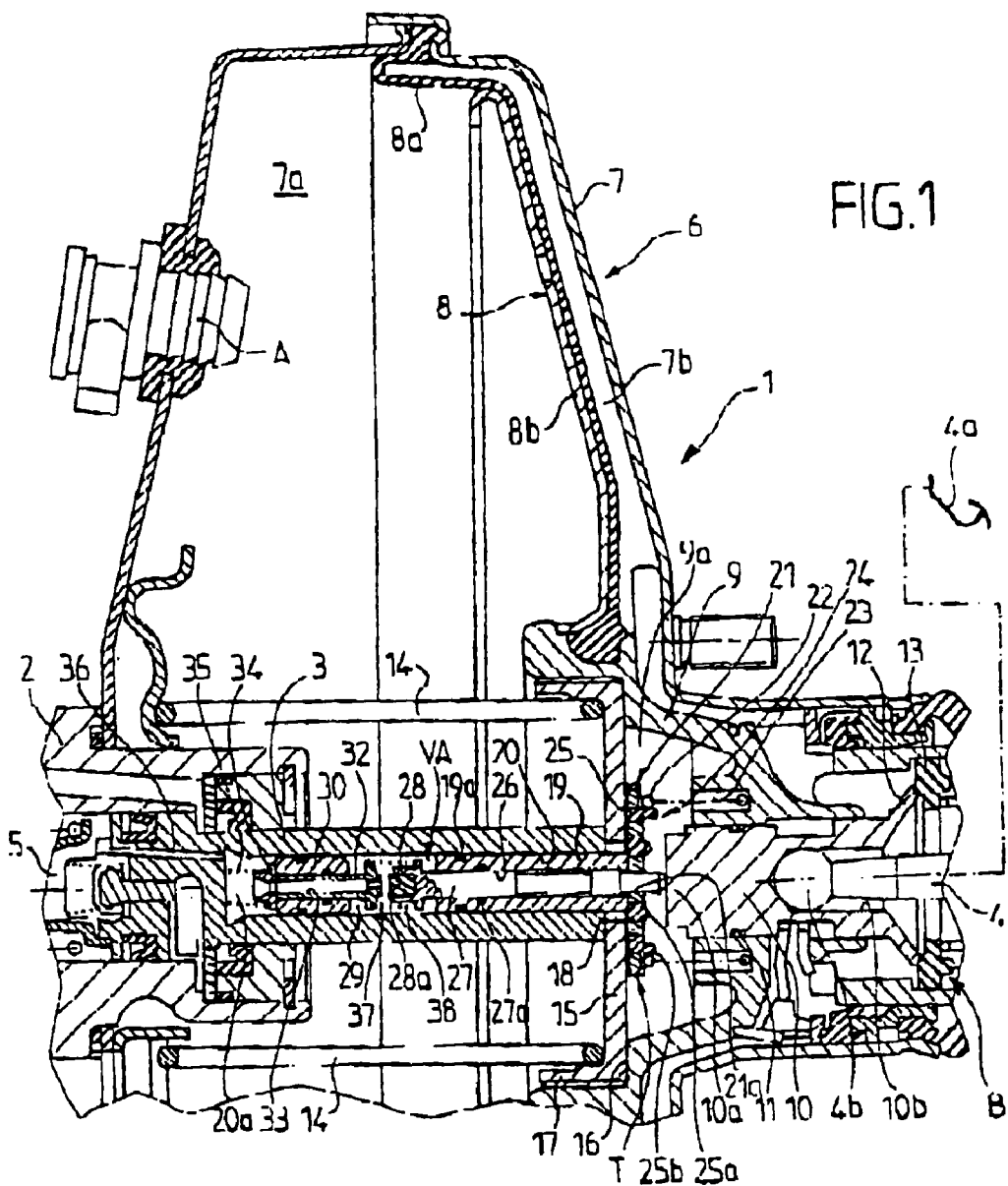
FIG. 1 is a part view in section, with partial cutaway, of a braking device according to the invention in the position of rest.

FIG. 1 shows a braking device 1 for a motor vehicle which comprises a master cylinder 2, partially depicted, and a primary piston 3 slidingly mounted in the master cylinder 2. A manual operating member 4 comprising a linkage coaxial with the primary piston 3 is provided to exert on this piston an input force from the rear forwards, that is to say from right to left according to the depiction of FIG. 1. The forward movement of the primary piston 3 creates an increase in pressure of the liquid in the interior volume 5 of the master cylinder, connected to at least one hydraulic brake circuit. The operating member 4 is generally actuated by a brake pedal 4a depicted schematically.

A pneumatic booster 6 is coupled to the operating member 4. The booster 6 comprises a rigid casing 7 internally divided in a sealed manner into two pneumatic chambers 7a, 7b by a moving partition 8 comprising a diaphragm 8a made of elastomeric material and a rigid skirt 8b. The chamber 7a is permanently connected to a source of partial vacuum (not depicted) by a nozzle A. A pneumatic piston 9 in the form of a sleeve coaxial with the primary piston 3 is fixed to the rigid skirt 8b. The pneumatic piston 9 is slidably mounted, in a sealed manner, on a plunger distributor 10, of cylindrical overall shape. Sealing is provided by an O-ring 11.

The plunger distributor 10 comprises, towards the front, a head 10a and, towards the rear, an axial blind housing 10b, open to the rear, which accommodates a bore 4b provided at the end of the linkage 4. The plunger distributor 10, on the opposite side to the piston 3, has a frustoconical widening 12 which can bear in a sealed manner against a ring 13 made of elastomeric material connected in terms of axial translation with the pneumatic piston 9. The assembly 12, 13 constitutes part of a three-way valve B (partially depicted) which makes it possible either to isolate the chamber 7b from the atmosphere and place the chambers 7a, 7b in communication, or to isolate the chambers 7a, 7b from one another and let air at atmospheric pressure into the chamber 7b when the widening 12 moves axially away from the ring 13.

The pneumatic piston 9 is returned to its position of rest, depicted in FIG. 1, by a compression spring 14 arranged between the piston 9 and the opposite wall of the casing 7, to which the master cylinder 2 is fixed. The pneumatic piston 9 has more or less the shape of a bell, lying down horizontally, coaxial with the piston 3, with its cavity 9a facing forwards. The piston 9 may be made of rigid plastic.

Figure 3:
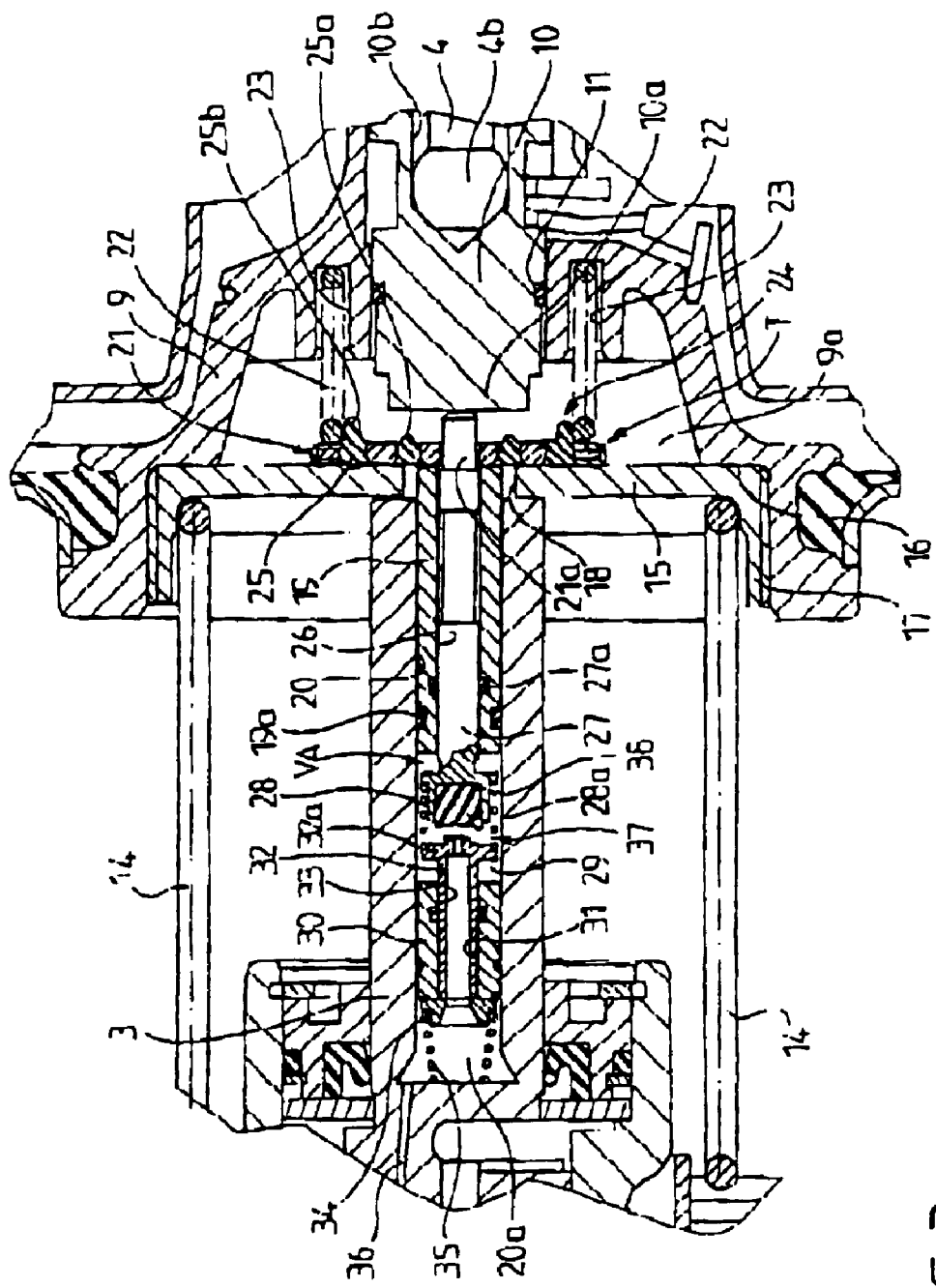
FIG. 3 is a part view in section, on a larger scale, of elements of FIG. 1 and of the emergency assist valve, in the position of rest.
Figure 4:
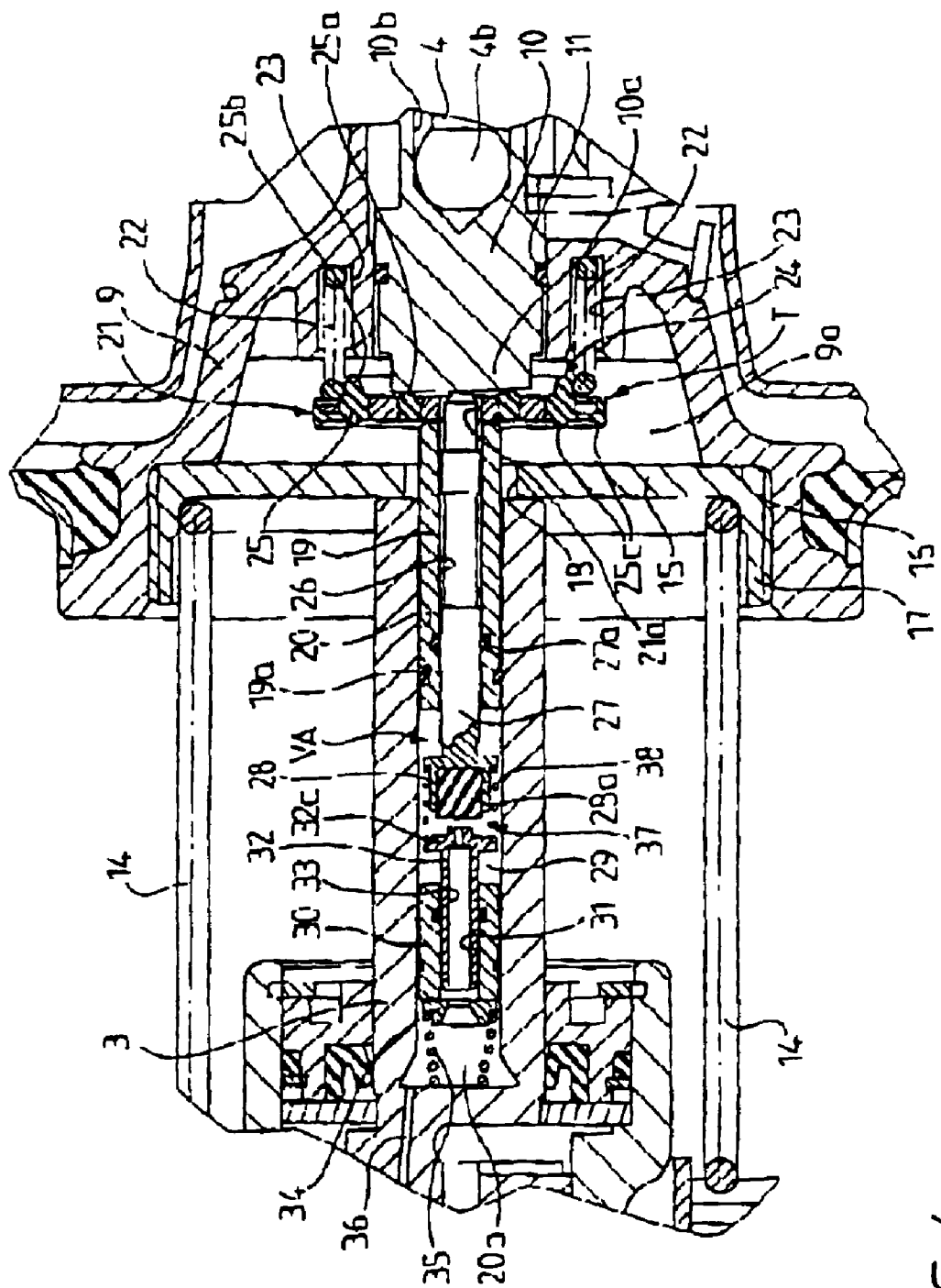
FIG. 4 shows, in a similar way to FIG. 3, the positions of the elements during slow braking in equilibrium.

A piston reinforcement consisting of a disc 15, for example of metal, is arranged at the front of the cavity 9a, at right angles to the geometric axis of the piston 9. The disc 15 is connected to the piston 9 and is held bearing axially backwards, near its periphery, against a shoulder 16 of the pneumatic piston 9. In the embodiment of FIGS. 1, 3 and 4, the disc 15 comprises a cylindrical peripheral skirt 17 facing forwards, externally threaded and screwed into a mating internal screwthread of a cylindrical part of the pneumatic piston 9. The piston reinforcement 15 comprises a central opening 18 and may come into contact at the front with the primary piston 3 near the contour of the opening 18. The reinforcement 15 constitutes the front wall of a closed chamber corresponding to the cavity 9a.

An emergency assist valve VA is provided to invoke at least two boost ratios corresponding respectively to normal (slow) braking and to emergency braking.

The valve VA comprises a reaction piston 19, the exterior surface of which is cylindrical, of constant diameter. The reaction piston 19 slides in a sealed manner by virtue of an O-ring 19a in an axial bore 20 of the primary piston 3. The rear end of the reaction piston 19 can pass through the opening 18, the diameter of which is greater than that of the piston 19, to come to bear axially against a force-transmitting element T consisting of a metal plate 21, preferably circular, situated in the cavity 9a of the piston 9 on the side of the piston reinforcement 15 away from the piston 3. The plate 21 comprises a central opening 21a and can be moved axially in the piston 9.

A helical compression spring 22, known as the jump spring, is provided on the outside of the primary piston 3. The spring 22 is advantageously arranged in the cavity 9a of the pneumatic piston 9 around the plunger distributor 10, on the opposite side of the reinforcement 15 to the primary piston 3. The spring 22 bears axially, forwards, against the plate 21 and, backwards, against the pneumatic piston 9 which has an annular groove 23 in which the spring 22 is partially housed. The plate 21, subjected to the thrust of the spring 22, is retained at the front by the reinforcement 15 connected to the piston 9.

The jump spring 22 may have a large diameter, greater than the outside diameter of the primary piston 3.

The plate 21 is equipped with a reaction deadening means 24 formed by a mass 25 of elastomeric material housed in openings in the plate 21 and bonded to the latter. The elastomeric mass 25 has two annular bulges 25a, 25b projecting backwards, and an annular bulge 25c projecting forwards. The bulge 25a allows contact between the plate 21 and the plunger distributor 10 to be deadened. The bulge 25b, radially further from the geometric axis of the plunger distributor 10, deadens contact with the end of the pneumatic piston 9. The outside diameter of the bulge 25b advantageously corresponds to the inside diameter of the turns of the spring 22, so as to centre the plate 21 in this spring.

The bulge 25c situated on the other side of the plate 21 deadens contact with the piston reinforcement 15.

The reaction piston 19 comprises an axial bore 26 in which a ratio control 27, formed by a rod, is slidably mounted in a sealed manner by virtue of an O-ring 27a. The rear end of the ratio control 27 passes through the opening 21a in the plate 21 to bear against the head 10a of the plunger distributor 10. The front end of the ratio control 27 has a head 28 situated in a chamber 29 of the bore 20 lying between the reaction piston 19 and a bushing 30 housed further forward in the bore 20.

The bushing 30 is blocked axially in the bore 20, for example by force fitting. This bushing 30 comprises an axial bore 31 which passes completely through it and in which a rapid piston 32 is slidably mounted in a sealed manner by virtue of an O-ring. The outside diameter of the rapid piston 32 is smaller than that of the reaction piston 19. The rapid piston 32 has passing axially through it a passage 33 which is open at each end. The front end of the rapid piston 32 bears against a slide 34 pushed elastically by a retaining spring 35 against the bushing 30. The spring 35 at the other end bears against the bottom of the bore 20.

The front zone 20a of the bore 20 in which the spring 35 is housed communicates via a passage 36 with the interior volume 5 of the master cylinder 2. The rear end 32a (FIG. 3) of the rapid piston 32 is situated in the chamber 29 near the head 28 of the ratio control. This rear end 32a forms, with the head 28, a valve 37 which, for example, comprises an annular bearing surface on the end face 32a and a plug of elastomeric material 28a fixed into the head 28 and which projects to press in a sealed manner against the face 32a. A compression spring 38 is arranged between two shoulders provided respectively on the piston 32 and on the head 28 to act in the direction of opening of the valve. At rest, the valve 37 is open.

That being the case, the way in which the boosted braking device according to the invention works is as follows. Let us consider the case of slow braking.

In the position of rest of FIGS. 1 and 3, the jump spring 22 pushes the plate 21 against the pneumatic piston reinforcement 15. The reaction piston 19 bears via its rear end against the plate 21. The ratio control 27 bears against the head 10a of the plunger distributor 10.

The manual control member 4 is moved, relatively slowly, forwards. The valve B is actuated and cuts off the communication between the chambers 7a and 7b, then the frustoconical widening 12 moves away from the elastic ring 13, which lets air at atmospheric pressure into the chamber 7b of the booster 6.

Figure 2:
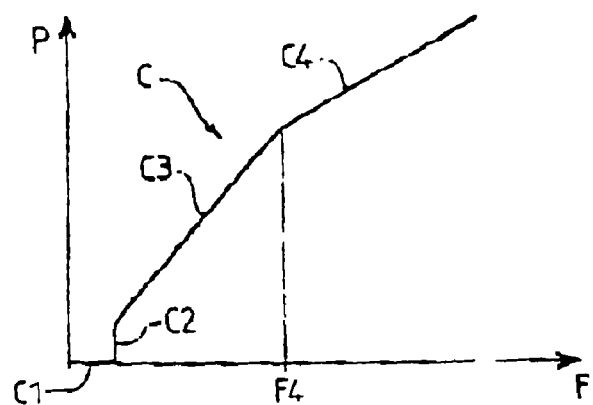
FIG. 2 is a graphical representation of the variation in the hydraulic pressure P in the master cylinder, plotted on the Y-axis, as a function of the force F exerted on the manual operating member.

In the curve C of FIG. 2, this phase of movement of the member 4 for opening the valve B corresponds to the segment C1 with zero Y-axis value, because the force moving the member 4 does not cause an increase in the pressure P in the master cylinder 2.

Once the valve B has opened, the pressure in the chamber 7b increases and the moving partition 8 transmits the boost force to the pneumatic piston 9 which moves forwards against the action of the spring 14. The piston 9 drives the reinforcement 15 which pushes the primary piston 3 forwards. The pressure of the liquid increases in the volume 5 and in the chamber 29 which communicates with this volume because the valve 37 is open. The pressure generates, on the reaction piston 19, a backward force. When this force reaches and exceeds the preload of the spring 22, the reaction piston 19 retreats, pushing the plate 21 until it comes into abutment against the head 10a as illustrated in FIG. 4. The bulge 25a deadens the impact and avoids noise.

This phase is known as the jump and is depicted by a vertical segment C2 in FIG. 2. There is an increase in pressure in the master cylinder 5 with no increase in the force exerted on the member 4.

FIG. 4 depicts the configuration during slow braking, in equilibrium, that is to say when the valve B is closed and the member 4 is stopped in the position depicted in FIG. 4.

If the driver continues his braking effort so that the input force on the member 4 continues to increase, the plunger distributor 10 continues its forward movement; the pneumatic piston 9 follows the plunger distributor 10 and pushes the primary piston 3 with the boost force. The pressure of the liquid in the volume 5 continues to increase along the segment C3 of FIG. 2.

When the booster 6 produces its maximum force, saturation is achieved and this corresponds to the upper end of the segment C3, with X-axis value F4.

Beyond the saturation point, the operating member 4 continues to advance under the action of the manual input force. The ratio control 27 advances relative to the primary piston 3 and the head 28 presses against the end 32a so that the valve 37 closes.

The plate 21, pushed by the plunger distributor 10, comes to bear against the piston reinforcement 15 and the bulge 21c deadens the impact. The manual input force exerted on the member 4 is then transmitted by the reinforcement 15 to the primary piston 3, and this causes an increase in the pressure in the master cylinder 2 along the segment C4 of FIG. 2, with a gradient which is not as steep as that of the segment C3.

In the case of rapid braking, the plunger distributor 10 moves, at the start, more rapidly than the piston 9 which means that the ratio control 27 advances relative to the primary piston 3; as a consequence, the valve 37 closes. The head 10a of the plunger distributor comes to bear against the bulge 25a of the plate 21, itself bearing against the piston reinforcement 15 which pushes the primary piston 3. As the valve 37 is closed, the hydraulic reaction is exerted only over the small cross-sectional area of the rapid piston 32.

According to the invention, the jump spring 22 situated on the outside of the primary piston 3 may have large dimensions, particularly a large diameter. It is thus possible for it to be given a high preload which makes it possible to obtain a tall segment C2 (FIG. 2), for example of the order of 15 to 20 bar. This then gives a greater jump. This gives the braking greater bite, with sharper application of the brake pads.

Furthermore, the length of the spring 22 can be tailored precisely, which makes it possible to reduce the spread on the jump. What happens is that the arrangement of the spring 22 outside the piston 3, in the booster 6, makes it possible to reduce a build-up of manufacturing dimensions involved in determining the operating parameters. The emergency valve VA adjusting dimensions no longer have an influence on the length of the spring used.

With the spring 22 arranged in the piston 9 of the booster 6, just one system, closed by the reinforcement 15, is assembled at the factory; the braking device is then adjusted subsequently without touching the subassembly containing the jump spring 22.

FIGS. 5 and 6 show an alternative form of embodiment in which improved guidance of the transmission element T is envisaged. Elements which are identical or play similar parts to elements already described with regard to the previous figures are denoted by the same numerical references, possibly preceded by the number 1 in the hundreds column, without being described again.

The bearing plate 121, forming the transmission element, is secured to a rear-facing coaxial sleeve 39. A bore 40, of diameter greater than the bore 26 of the reaction piston 19, passes coaxially right through the sleeve 39. The rear part of the ratio control 27 is engaged in the bore 40.

At its front end, the plunger distributor 10 comprises a blind bore 41, the inside diameter of which is equal to the outside diameter of the sleeve 39, give or take the clearance for sliding. The sleeve 39 is engaged in this bore 41. A cylindrical push-rod 42 is engaged in a coaxial housing of the plunger distributor 10 provided in the bottom of the blind bore 41. The push-rod 42 projects into the bore 41 and can fit into the bore 40 of the sleeve 39 to come into abutment against the rear end of the ratio control 27.

The piston reinforcement 15 consists of a flat disc which, unlike FIGS. 1 and 3, does not have an externally threaded cylindrical skirt. The reinforcement 15 is retained in the piston 9, bearing against the shoulder 16, by a split elastic ring 15a anchored in an annular groove 9b of the piston 9 in abutment against the front face of the reinforcement 15.

The way in which the alternative form of FIG. 5 works is similar to the way described previously. The stated advantages are maintained and, furthermore, the sliding of the plate 121 is better guided through the collaboration between the sleeve 39 and the blind bore 41.

The invention makes it possible to cover the various boost ratios, particularly from 3.5 to 6.6, regardless of the diameter of the master cylinder 2 (which in particular may vary from 19 mm to 25.4 mm) and the desired value of the jump (which may be 20 bar when the diameter of the master cylinder 2 is less than 23.8 mm, and 15 bar when the diameter of the master cylinder 2 is equal to 25.4 mm) without a major design modification.

The deadening is identical for all the solutions envisaged and is achieved by just one component 21, 121. The dimension of the component makes it possible to increase the size of the deadening parts and therefore to substantially reduce the amount of noise.

The shape of the reaction piston 19 is simplified, and the guidance of this piston 19 is improved.

The increase in the space set aside for the jump spring 22 makes it possible to reduce the tolerance on the value of the jump by reducing the stiffness of the spring.

What is claimed is:

1. A boosted braking device for a motor vehicle, comprising a master cylinder (2) controlling the pressure in at least one brake circuit, a primary piston (3) slidably mounted in the master cylinder to create therein a variation in pressure, this primary piston being subjected to an actuating force made of an input force exerted by a manual operating member (4) and of a boost force exerted by a booster (6) coupled to the manual operating member (4), and an emergency assist valve (VA) which comprises: a reaction piston (19) subjected to the action of an elastic return means (22) returning it to a position of rest, the reaction piston (19) sliding in a sealed manner in a bore (20) of the primary piston, the front part (20a) of this bore communicating with the interior volume (5) of the master cylinder; a rapid piston (32) of a cross section smaller than that of the reaction piston (19) sliding in a sealed manner in another bore (33) of corresponding diameter; and a ratio control (27) actuated by a plunger distributor (10) itself driven by the manual operating member (4), the assembly being arranged so that, under emergency braking, a hydraulic reaction is exerted only on the cross section of the rapid piston (32), characterized in that the elastic return means (22) for returning the reaction piston (19) is arranged outside the primary piston (3), and in that a transmission element (T) is provided to transmit the return force of the elastic means (22) to the reaction piston (19).

2. The braking device according to claim 1, characterized in that the elastic return means (22) for returning the reaction piston is arranged inside the booster (6).

3. The braking device according to claim 1, characterized in that the booster (6) comprises a pneumatic piston (9) which comprises a cavity (9a) facing forwards, and in that the elastic return means consists of a compression spring (22), or jump spring, arranged in this cavity (9a).

4. The braking device according to claim 3, characterized in that it comprises a pneumatic piston reinforcement consisting of a disc (15) with a central opening (18) for the passage of the reaction piston (19), this disc being connected to the pneumatic piston (9) and determining therewith a chamber in which the jump spring (22) is placed, the disc (15) bearing, forwards, against the primary piston (3).

5. The braking device according to claim 4, characterized in that the disc (15) is held, in the pneumatic piston (9), bearing backwards against a shoulder (16) of the pneumatic piston.

6. The braking device according to claim 5, characterized in that the disc (15) comprises, at its periphery, a forward-projecting cylindrical skirt (17), externally threaded and screwed into a mating screwthread provided on the interior surface of a cylindrical part of the pneumatic piston (9).

7. The braking device according to claim 5, characterized in that the disc (15) is held, at the front, by a split elastic ring (15a) anchored in a groove (9b) of the pneumatic piston (9).

8. The braking device according to claim 1, characterized in that the transmission element (T) comprises a plate (21, 121) comprising a central opening (21a, 40) for the passage of the ratio control (27), this plate bearing, on one side, against the reaction piston (19) and, on the other side, against the elastic return means (22).

9. The braking device according to claim 8, characterized in that the plate (21, 121) is arranged so that it can move in the pneumatic piston (9), to the rear of the piston reinforcement (15).

10. The braking device according to claim 9, characterized in that the plate (21, 121) comprises, at least on its face facing towards the plunger distributor (10), a reaction deadening means (24) for deadening the contact between the plate and the plunger distributor (10).

11. The braking device according to claim 10, characterized in that the deadening means (24) consists of a mass of elastomeric material (25) bonded to the plate (21, 121) and having at least one bulge (25a, 25b) projecting backwards towards the plunger distributor (10).

12. The braking device according to claim 11, characterized in that the mass of elastomeric material (25) comprises another bulge (25c) projecting forwards.

13. The braking device according to claim 12, characterized in that a guide means (39, 41) for guiding the plate (121) is provided, for guiding it relative to the plunger distributor (10).

14. The braking device according to claim 13, characterized in that the guide means comprises a central cylindrical sleeve (39) secured to the plate (121), projecting towards the plunger distributor (10), this sleeve (39) being slidingly received in a blind bore (41) of the plunger distributor, open to the front.

15. The braking device according to claim 14, characterized in that the sleeve (39) comprises a central passage (40) for the ratio control (27) and for a push-rod (42) provided on the plunger distributor.

16. A pneumatic booster for a boosted braking device with an emergency valve according to any one of the preceding claims, comprising a rigid casing (6) divided into two pneumatic chambers (7a, 7b) by a moving partition (8) which can be subjected to a difference in pressure between the chambers under the action of a valve (B) actuated by the manual operating member (4), this moving partition (8) driving a pneumatic piston (9), characterized in that a jump spring (22) for an emergency valve is housed in the booster and in that a transmission element (T) for transmitting the force of the jump spring is also provided in the booster (6).

17. The booster according to claim 16, characterized in that the pneumatic piston (9) has a cavity (9a) facing forwards, in that a piston reinforcement (15) connected to the pneumatic piston is arranged at the front of this cavity and in that the jump spring (22) is arranged in the cavity (9a) between the bottom of the cavity and a plate (21, 121) which can move in the pneumatic piston and which is stopped at the front via the piston reinforcement (15).

18. The booster according to claim 17, characterized in that the piston reinforcement (15) comprises a central opening (18) for the passage of the reaction piston (19) of an emergency valve, while the plate (21, 121) comprises a central opening (21a, 40) for the passage of the ratio control of the emergency valve.

\* \* \* \* \*